United States Patent
Fung et al.

(10) Patent No.: US 8,041,893 B1
(45) Date of Patent: Oct. 18, 2011

(54) SYSTEM AND METHOD FOR MANAGING LARGE FILESYSTEM-BASED CACHES

(75) Inventors: Kin-Chung Fung, Houston, TX (US); Mark R. Scheevel, Austin, TX (US)

(73) Assignee: Vignette Software LLC, Austin, TX (US)

( * ) Notice: Subject to any disclaimer, the term of this patent is extended or adjusted under 35 U.S.C. 154(b) by 627 days.

(21) Appl. No.: 12/206,909

(22) Filed: Sep. 9, 2008

(51) Int. Cl.
G06F 12/16 (2006.01)
(52) U.S. Cl. .................................................. 711/118
(58) Field of Classification Search ................. None
See application file for complete search history.

(56) References Cited

U.S. PATENT DOCUMENTS

| | | | |
|---|---|---|---|
| 5,202,982 A | 4/1993 | Gramlich et al. |
| 5,473,772 A | 12/1995 | Halliwell et al. |
| 5,504,879 A | 4/1996 | Eisenberg et al. |
| 5,740,430 A | 4/1998 | Rosenberg et al. |
| 5,946,697 A | 8/1999 | Shen |
| 6,029,175 A | 2/2000 | Chow et al. |
| 6,151,624 A | 11/2000 | Teare et al. |
| 6,178,461 B1 | 1/2001 | Chan et al. |
| 6,192,415 B1 | 2/2001 | Haverstock et al. |
| 6,198,824 B1 | 3/2001 | Shambroom |
| 6,272,492 B1 | 8/2001 | Kay et al. |
| 6,408,360 B1 | 6/2002 | Chamberlain et al. |
| 6,571,246 B1 | 5/2003 | Anderson et al. |
| 6,591,266 B1 | 7/2003 | Li et al. |
| 6,651,217 B1 | 11/2003 | Kennedy et al. |
| 6,697,844 B1 | 2/2004 | Chan et al. |
| 6,701,428 B1 | 3/2004 | Harvey, III et al. |
| 6,754,621 B1 | 6/2004 | Cunningham et al. |
| 6,760,813 B1 | 7/2004 | Wu |
| 6,772,203 B1 | 8/2004 | Feiertag et al. |
| 6,785,769 B1 | 8/2004 | Jacobs et al. |
| 6,850,941 B1 | 2/2005 | White et al. |
| 7,024,452 B1 | 4/2006 | O'Connell et al. |
| 7,137,009 B1 | 11/2006 | Gordon et al. |
| 7,188,216 B1 | 3/2007 | Rajkumar et al. |
| 7,360,025 B1 | 4/2008 | O'Connell et al. |
| 7,398,304 B2 | 7/2008 | Smith et al. |
| 7,752,394 B1 | 7/2010 | Rajkumar et al. |
| 7,818,506 B1 | 10/2010 | Shepstone |

(Continued)

OTHER PUBLICATIONS

Office Action issued in U.S. Appl. No. 11/825,909 mailed Sep. 29, 2009, 9 pgs.

(Continued)

*Primary Examiner* — Duc Doan
(74) *Attorney, Agent, or Firm* — Sprinkle IP Law Group

(57) ABSTRACT

Embodiments disclosed herein utilize statistical approximations to manage large filesystem-based caches based on imperfect information. When removing entries from a large cache, which may have a million or more entries, the cache manager does not need to find the absolutely oldest entry that has been accessed the least recently. Instead, it suffices to find an entry that is older than most. In embodiments disclosed herein, statistical sampling of the cache is performed to produce models of different properties of the cache, including the number of entries, distribution of access times, distribution of entry sizes, etc. The models are then used to guide decisions that involve those properties. The size of the samples can be adjusted to balance the cost of acquiring the samples against the confidence level of the models produced by the samples. To achieve randomness, entries are stored using prefixes of addresses generated via a message-digest function.

18 Claims, 5 Drawing Sheets

U.S. PATENT DOCUMENTS

| | | |
|---|---|---|
| 2001/0032254 A1 | 10/2001 | Hawkins |
| 2001/0034771 A1 | 10/2001 | Hutsch et al. |
| 2001/0037407 A1 | 11/2001 | Dragulev et al. |
| 2002/0065912 A1 | 5/2002 | Catchpole et al. |
| 2002/0165877 A1 | 11/2002 | Malcolm et al. |
| 2002/0178187 A1 | 11/2002 | Rasmussen et al. |
| 2002/0194219 A1 | 12/2002 | Bradley et al. |
| 2003/0078964 A1 | 4/2003 | Parrella et al. |
| 2003/0217117 A1 | 11/2003 | Dan et al. |
| 2004/0030697 A1 | 2/2004 | Cochran et al. |
| 2004/0030746 A1 | 2/2004 | Kavacheri et al. |
| 2004/0107319 A1 | 6/2004 | D'Orto et al. |
| 2004/0205165 A1 | 10/2004 | Melamed et al. |
| 2004/0205452 A1 | 10/2004 | Fitzsimmons et al. |
| 2006/0136472 A1 | 6/2006 | Jujjuri et al. |
| 2006/0184572 A1* | 8/2006 | Meek et al. ............... 707/103 X |
| 2010/0262785 A1 | 10/2010 | Rajkumar |

OTHER PUBLICATIONS

Office Action issued in U.S. Appl. No. 11/701,193, mailed Oct. 22, 2009, 10 pgs.
Office Action issued in U.S. Appl. No. 12/819,985 mailed Aug. 2, 2010, 9 pgs.
Office Action issued in U.S. Appl. No. 11/701,193 dated Mar. 31, 2009, Rajkumar, 9 pages.
Office Action issued in U.S. Appl. No. 11/825,909 mailed Mar. 5, 2010,11 pgs.
Notice of Allowance issued in U.S. Appl. No. 12/819,985 mailed Dec. 15, 2010, 10 pgs.
Office Action for U.S. Appl. No. 12/904,937, mailed Jan. 5, 2011, 12 pgs.
Chen et al., "Wormhole Caching with HTTP PUSH Method for Satellite-Based Web Content Multicast and Replication System" Workshop 99, pp. 1-14, 1999.
Fielding et al. "13 Caching in HTTP" part of Hypertext Transfer Protocol—HTTP/1.1, The Internet Society, 20 pgs, 1999.
Dias et al., A Smart Internet Caching System by University of Moratuwa, Sri Lanka, 13 pgs, 1996.
Office Action issued in U.S. Appl. No. 10/733,798, dated May 31, 2006, 14 pgs.
Office Action issued in U.S. Appl. No. 10/733,798, dated Jan. 3, 2006, 9 pgs.
Office Action issued in U.S. Appl. No. 10/733,742, dated Aug. 22, 2007, 14 pgs.
Office Action issued in U.S. Appl. No. 10/733,742, dated Feb. 7, 2007, 12 pgs.
Office Action issued in U.S. Appl. No. 10/733,742, dated Sep. 15, 2006, 8 pgs.
Office Action issued in U.S. Appl. No. 10/733,742, dated Jun. 6, 2006, 15 pgs.
Office Action issued in U.S. Appl. No. 10/733,742, dated Jan. 17, 2006, 10 pgs.
Office Action issued in U.S. Appl. No. 11/701,193, dated Oct. 2, 2008, 9 pgs.
Office Action for U.S. Appl. No. 12/212,414, mailed May 10, 2011, 24 pgs.
Office Action for U.S. Appl. No. 12/208,934, mailed May 10, 2011, 25 pgs.
Office Action for U.S. Appl. No. 12/904,937, mailed May 25, 2011, 11 pgs.
Office Action for U.S. Appl. No. 12/904,937, mailed Sep. 2, 2011, 13 pgs.

* cited by examiner

(12)  United States Patent US 8,041,893 B1

SYSTEM AND METHOD FOR MANAGING LARGE FILESYSTEM-BASED CACHES

TECHNICAL FIELD OF THE DISCLOSURE

This disclosure relates generally to cache management and, more particularly, to cache management for large filesystem-based caches utilized in connection with web site requests. Even more particularly, this disclosure provides systems and methods for managing large filesystem-based caches based on imperfect information.

BACKGROUND OF THE DISCLOSURE

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety of methods in which to communicate data, one of the most ubiquitous of which is the World Wide Web, also referred to as the web. Other methods for communicating data over the Internet include e-mail, Usenet newsgroups, telnet and FTP.

The World Wide Web is a system of Internet servers, typically called "web servers", that support the documents and applications present on the World Wide Web.

Documents, known as web pages, may be transferred across the Internet according to the Hypertext Transfer Protocol ("HTTP") while applications may be run by a Java virtual machine present in an internet browser. Web pages are often organized into web sites that represent a site or location on the Web. The web pages within a web site can link to one or more web pages, files, or applications at the same web site or at other web sites. A user can access web pages using a browser program running on the user's computer or web-enabled device and can "click on" links in the web pages being viewed to access other web pages.

Each time the user clicks on a link, the browser program generates a request and communicates it to a web server hosting web pages or applications associated with the web site. The web server retrieves the requested web page or application from an application server or Java server and returns it to the browser program. Web pages and applications can provide a variety of content, including text, graphics, interactive gaming and audio and video content.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Conventional web content caching systems and methods generally enforce limits on cache size by employing a least-recently-used (LRU) algorithm. Generally, when a cache is at its limit and a new entry needs to be added to the cache, the entire cache is scanned and the cache entry that has been used the least recently is selected and then removed from the cache. This process may be repeated until enough room has been created in the cache for the new entry.

SUMMARY OF THE DISCLOSURE

Embodiments of a high performance content delivery system disclosed herein improve system performance by exploiting the fact that many users of a web site request identical content. Rather than regenerate that content afresh for each user, the system can save in a filesystem-based cache a copy of the content generated for one user and serve that copy to a second user if it can be determined that the second user is making an equivalent request. However, for large sites this can lead to the storage of many copies (entries) of different content in the cache. In order to keep storage space within some limit, old copies would have to be removed from the cache. As the number of copies grows, managing these copies and hence the cache can become increasingly expensive.

One particular challenge of the conventional LRU approach is in locating the entry that is the least recently used. For large caches, searching for that entry is unacceptably expensive as a large cache may contain hundreds of thousands, if not millions, of entries. Thus, cache managers for large caches usually maintain an additional data structure: a list of the entries sorted by access time. This makes it easy to find the entry that has been accessed the least recently, but it adds the storage overhead for the list. What is more, the list itself increases the cost of accessing an entry in the cache because the list also has to be adjusted to move the accessed entry to the front. Furthermore, accesses that occur outside the cache manager's notice can render its access time list inaccurate. Finally, for extremely large caches, the storage required by the list itself can also become problematic.

Embodiments disclosed herein are directed to systems and methods for managing large filesystem-based caches utilizing statistical approximations. Conventionally, when removing entries, the cache manager needs to continually scan the entire cache and find the exact least-recently-used entry. Embodiments disclosed herein do not require perfect information. When removing entries, the cache manager does not need to find the absolutely "oldest" entry (oldest in the sense that it has been accessed the least recently): it suffices to find an entry that is older than most. In embodiments disclosed herein, statistical sampling of the cache is performed to produce models of different properties of the cache. These different properties may include the number of entries, distribution of access times, distribution of entry sizes, and so on. These models are then used to guide decisions that involve those properties. The size of the samples can be adjusted to balance the cost of acquiring the samples against the confidence level of the models produced by the samples. In order for a statistical sampling of a population to faithfully represent the population in a statistically significant manner, it is important that the samples are selected from the population at random. To achieve randomness, entries are stored in the cache using prefixes of addresses generated via a message-digest function such as Message-Digest algorithm 5 (MD5).

The above-described approach enjoys several advantages over the traditional LRU solution. First, sample collection can proceed in parallel with normal cache accesses; there is no list management overhead for accessing cache entries. Second, for any given confidence level, the size of the sample that must be collected grows much more slowly than the size of the cache. This slower growth is due to a fundamental result from statistics theory. Third, this approach is better able to tolerate outside manipulation of the cache entries. This is especially important for a filesystem-based cache, since it is possible for users to use operating system commands to delete entries from the cache, outside the notice of the cache manager.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

Figure 1:
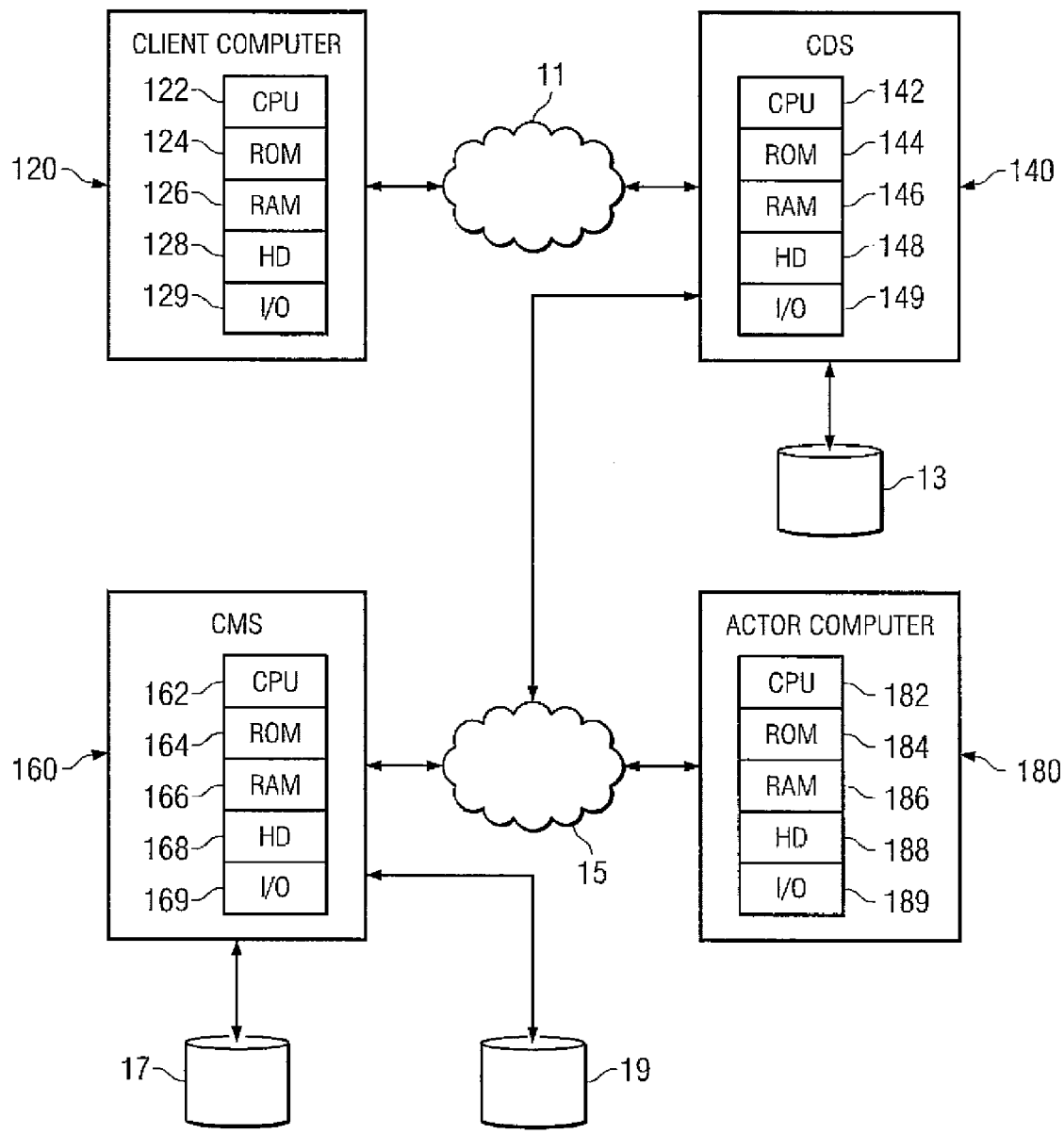
FIG. 1 is a diagrammatic representation of a hardware configuration of a network implementing embodiments disclosed herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider. Many ISPs use proxy caches to save bandwidth on frequently-accessed web pages. Web page caches and client-side network file system caches are typically read-only or write-through only to keep the network protocol simple and reliable. A network file system is basically a computer file system that supports sharing of files, printers and other resources as persistent storage over a computer network. A cache of recently visited web pages can be managed by a client computer's web browser. Some browsers are configured to use an external proxy web cache, a server program through which all web requests are routed so that it can cache frequently accessed pages for everyone in an organization. Search engines also frequently make web pages they have indexed available from their cache, which can be useful when web pages are temporarily inaccessible from a web server. Embodiments disclosed herein are directed to cache management for server-side file system caches that store copies of recently requested web content generated by page generation software at the back end, as opposed to the cache of recently visited web pages managed by a client computer's web browser at the front end.

Within this disclosure, the term "software component" refers to at least a portion of a computer program (i.e., a software application). Specifically, a software component can be a piece of code that when executed by a processor causes a machine to perform a particular function. Examples include a content delivery software component, a content management software component, a page generation software component, or the like. Different software components may reside in the same computer program or in different computer programs on the same computer or different computers.

Reference is now made in detail to the exemplary embodiments of the disclosure, examples of which are illustrated in the accompanying drawings. Wherever possible, the same reference numbers will be used throughout the drawings to refer to the same or like parts (elements).

FIG. 1 illustrates an exemplary architecture and includes external network 11 that can be bi-directionally coupled to client computer 120 and content delivery system ("CDS") 140. CDS 140 can be bi-directionally coupled to database 13. An internal network 15 can be bi-directionally coupled to CDS 140, content management system ("CMS") 160, and actor computer 180. CMS 160 can be bi-directionally coupled to databases 17 and 19, each of which may contain data objects and metadata regarding those objects in tables within those databases. CDS 140, CMS 160, and databases 13, 17, and 19 may be part of a network site. Note that FIG. 1 is a simplification of a hardware configuration.

Within each of CDS 140 and CMS 160, a plurality of computers (not shown) may be interconnected to each other over internal network 15 or a combination of internal and external networks. For simplification, a single system is shown for each of CDS 140 and CMS 160. Other systems such as a page generator, an application server, etc., may be part of CDS 140, CMS 160, or additional systems that are bi-directionally coupled to the internal network 15.

A plurality of other client computers 120 may be bi-directionally coupled to external network 11, and a plurality of actor computers 180 may be coupled to internal network 15. Actor computers 180 may include personal computers or workstations for individuals that use internal network 15. These individuals may include content developers, editors, content reviewers, webmasters, information technology specialists, and the like. Many other alternative configurations are possible and known to skilled artisans.

Client computer 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like. Client computer 120 can include a desktop computer, a laptop computer, a personal digital assistant, a cellular phone, or nearly other device capable of communicating over a network. Actor computer 180 may be similar to client computer 120 and can comprise CPU 182, ROM 184, RAM 186, HD 188, and I/O 189.

CDS 140 can include a server computer comprising CPU 142, ROM 144, RAM 146, HD 148, and I/O 149, and CMS 160 can include a server computer comprising CPU 162, ROM 164, RAM 166, HD 168, and I/O 169. CDS 140 or CMS 160 may have one or more of a content delivery software component, a page generator software component, a content management software component, an applications software component, and the like. In some embodiments, the page generator software component is a subcomponent of the content delivery software component.

Each of the computers in FIG. 1 may have more than one CPU, ROM, RAM, HD, I/O, or other hardware components. For simplicity, each computer is illustrated as having one of each of the hardware components, even if more than one is used. The content and its metadata, if any, may be located within any or all of CDS 140, CMS 160, and databases 13, 17, and 19. During staging, a user at actor computer 180 may have access to proxy objects for the content. After staging, data objects may be copied into database 13 via CDS 140, so that the data object may be accessed quicker by CDS 140 to respond to requests from client computer 120. Another advantage is that this separation of content items and proxies allows CDS 140 to deliver one version of a content item (or collection of content items) while the "original" undergoes modification in CMS 160.

Each of computers 120, 140, 160, and 180 is an example of a data processing system. ROM 124, 144, 164, and 184; RAM 126, 146, 166, and 186; HD 128, 148, 168, and 188; and databases 13, 17, and 19 can include media that can be read by CPU 122, 142, 162, or 182. Therefore, these types of memories include computer-readable storage media. These memories may be internal or external to computers 120, 140, 160, or 180.

Figure 2:
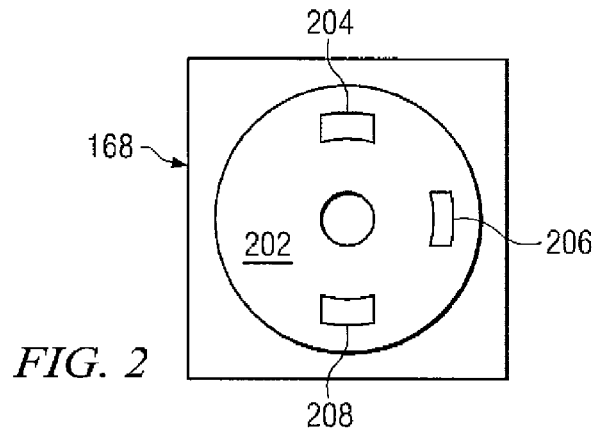
FIG. 2 is a diagrammatic representation of a computer-readable storage medium carrying software code having instructions implementing embodiments disclosed herein.

Portions of the methods described herein may be implemented in suitable software code that may reside within ROM 124, 144, 164, or 184, RAM 126, 146, 166, or 186, or HD 128, 148, 168, or 188. In addition to those types of memories, the instructions in an embodiment disclosed herein may be contained on a data storage device with a different computer-readable storage medium, such as a hard disk. FIG. 2 illustrates a combination of software code elements 204, 206, and 208 that are embodied within a computer-readable storage medium 202, on HD 168. Alternatively, the instructions may be stored as software code elements on a DASD array, magnetic tape, floppy diskette, optical storage device, or other appropriate data processing system readable medium or storage device.

In an illustrative embodiment, the computer-executable instructions may be lines of compiled $C^{++}$, Java, or other language code. Other architectures may be used. For example, the functions of one computer may be distributed and performed by multiple computers. Additionally, a computer program or its software components with such code may be embodied in more than one computer-readable medium, each of which may reside on or accessible by one or more computers.

In the hardware configuration above, the various software components and subcomponents, including content delivery, page generator, and content manager, may reside on and/or tie to a single server computer or on any combination of separate server computers. In alternative embodiments, some or all of the software components may reside on the same server computer. For example, the content delivery software component and the page generator software component could reside on the same server computer. In some embodiments, the content delivery software component and the page generator software component reside at different levels of abstraction. In some embodiments, the page generator software component is part of the content delivery service provided by the content delivery software component.

Communications between any of the computers in FIG. 1 can be accomplished using electronic, optical, radio-frequency, or other signals. For example, when a user is at client computer 120, client computer 120 may convert the signals to a human understandable form when sending a communication to the user and may convert input from a human to appropriate electronic, optical, radio-frequency, or other signals to be used by client computer 120, systems 140 or 160, or actor computer 180. Similarly, when an operator is at CMS 160, its server computer may convert the signals to a human understandable form when sending a communication to the operator and may convert input from a human to appropriate electronic, optical, radio-frequency, or other signals to be used by computers 120 or 180 or systems 140 or 160.

Attention is now directed to systems and methods for high performance cache management. These systems and methods may be used to manage cached content to be delivered to an end user at a client computer, increasing the performance of content delivery for a web site.

Figure 3:
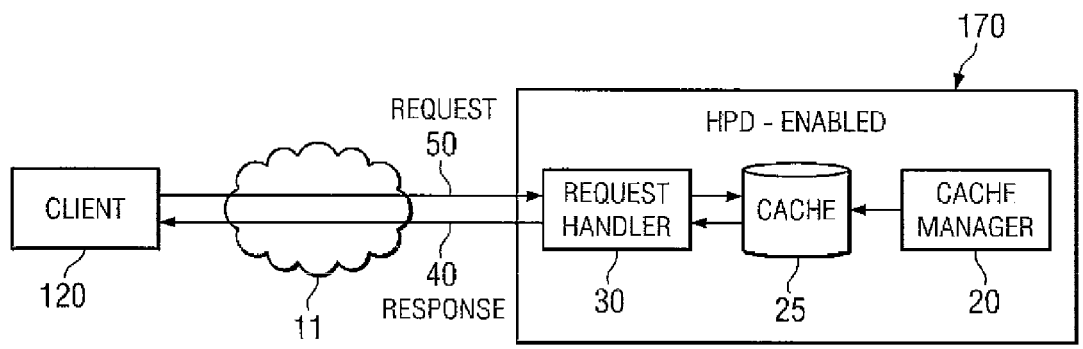
FIG. 3 is a block diagram depicting an embodiment of a system for high performance cache management.
Figure 4:
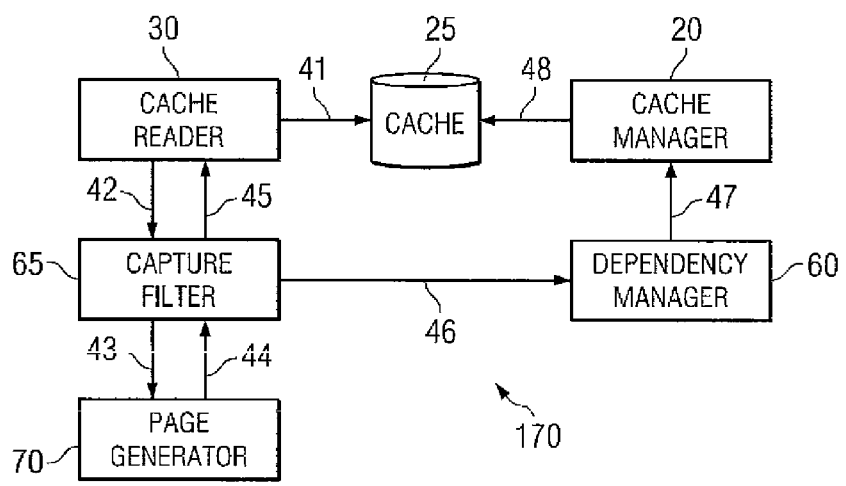
FIG. 4 is a block diagram depicting components of the system of FIG. 3.

FIG. 3 is a simplified diagrammatical representation of a distributed computing environment where high performance delivery (HPD)-enabled system 170 resides. Within the distributed computing environment, a plurality of computers (not all are shown in FIG. 3) may be interconnected to each other, including web server(s), application server(s), etc. For simplification, a single system is shown for system 170. System 170 can include a server computer comprising CPU, ROM, RAM, HD, and I/O as described above. In some embodiments, system 170 may comprise a content delivery software component, which comprises a page generator software subcomponent, a content management software component, an applications software component, and the like. In the example of FIG. 3, system 170 is shown to comprise request handler 30, cache 25, and cache manager 20 to illustrate scenarios involving these components. For example, in a cache hit scenario, request handler 30 can access cache 25 and return cached response 40 in response to request 50. Additional components of system 170 are shown in FIG. 4 to illustrate a cache miss scenario.

Cache manager 20 can dynamically update content stored in cache 25 based upon conditions other than a request for similar content. More specifically, using metadata stored in the cache with a piece of content, cache manager 20 may regenerate a request, and update the cached content. Cache manager 20 may be registered with an application manager which informs cache manager 20 when content has been updated. Updating the cache may be done in the background, without receiving a new request from a user; this allows content in the cache to be kept current and may drastically improve the performance and response time of a web site. This application manager may be part of a content deployment agent coupled to a content management system. The deployment agent may receive updated content, and the application manager may take notice when content has been updated on the deployment agent. The application manager may also be responsible for the assembly of content to be delivered by an application server in response to a request from a user. Examples of how a request can be regenerated and used to update cached content can be found in U.S. Pat. No. 7,360,025, entitled "METHOD AND SYSTEM FOR AUTOMATIC CACHE MANAGEMENT," the content of which is incorporated herein by reference.

Within this disclosure, content may be an application or piece of data provided by a web site such as an HTML page, Java application, or the like. In many cases, one piece of content may be assembled from other pieces of content chosen based on a request initiated by a user of the web site. As an example, a user on client computer or web-enabled device 120, through a browser application running thereon, may send request 50 for content over network 11 to request handler 30. Request handler 30 may be a software component of system 170. In some embodiments, request handler 30 further implements the function of a cache reader (CR). The requested content may be a page or a fragment thereof. This page may be associated with a web site or a web portal. The request may be in the form of an HTTP request containing a URL referencing the page as is known in the art.

The end user's request is fielded by CR 30. CR 30 checks cache 25 to see whether a previously-cached response can be used to satisfy the request; if so, it returns that previously-cached response (a cache hit) back to the user via client computer or web-enabled device 120. If no previously-cached response is applicable or can be found in cache 25, it is a cache miss.

FIG. 4 is a block diagram illustrating a cache miss scenario. In this case, the request is forwarded to capture filter (CF) 65 and then on to page generator (PG) 70, which is responsible for actually generating the new response. Once generated, that new response is returned to the end user via CF 65 and CR 30, and it is also submitted to cache 25 via dependency manager (DM) 60 and cache manager (CM) 20. More specifically, at step 41, request handler/cache reader 30 reads cache 25 and no applicable previously-cached response can be found in cache 25. At step 42, handler/cache reader 30 proxies the user's request for content to capture filter 65. At step 43, capture filter 65 may parse the request into a suitable form for further processing by other software components of system 170, set up caching context, and pass control to page generator 70. At step 44, page generator 70 operates to generate a new page or a piece of content responsive to the user's request, annotates the caching context, and returns the generated content and related information to capture filter 65. At step 45, capture filter 65 returns the generated content to request handler 30, which then communicates the content back to the user via client computer or web-enabled device 120. At step 46, capture filter 65 can supply the newly generated content and dependency information associated therewith to dependency manager 60. Dependency manager 60 records the dependency information in a dependency cache and, at step 47, communicates the generated content and information associated therewith to cache manager 20. Cache manager 20 then, at step 48, puts (writes) the newly generated content in cache 25. In most cases, incoming requests contain a variety of template data and parameters associated with the request. For example, the request may contain a Universal Resource Locator (URL), originating locale, a query string, or perhaps a user-agent string indicating the type of browser initiating the request. In some embodiments, these template metadata and request metadata are stored with the generated content in cache 25. These template metadata and request metadata can be used to regenerate a request that is identical to the original request from the end user. The regenerated request can be used to automatically update the cache independent of user requests as described in the above-referenced U.S. Pat. No. 7,360,025, entitled "METHOD AND SYSTEM FOR AUTOMATIC CACHE MANAGEMENT."

By saving in cache 25 a copy of the content generated for a first user, system 170 can serve that copy to a second user if it can be determined that the second user is making an equivalent request. This way, system 170 does not need to regenerate that content afresh for each user. For large sites this can lead to the storage of many copies of different content. Over time, the cache will fill up with entries. Administrators can configure limits for the cache, both for the number of entries in the cache and the space occupied by those entries, and it is the responsibility of the cache manager to enforce those limits. To keep storage space within those configuration limits, the cache manager continually needs to remove old copies in order to make room for new entries. However, as the number of copies in the cache grows, it can become prohibitively expensive and impractical for the content manager to try to keep exact information about the cache's size. For one thing, entries are continually being added to (because new pages are being requested) and removed from the cache (because pages are invalidated by changes to objects on which they depend). For another, the number of entries in the cache is typically very large, on the order of hundreds of thousands, if not millions. In some embodiments, a large cache has at least a million entries. It is undesirable, expensive, and impractical for the content manager to count and measure all of the entries in a large cache.

Moreover, multiple cache readers and multiple cache writers may access a single large server-side network file system cache at the same time. More specifically, multiple cache readers could be reading from the cache and multiple cache writers could be writing entries to and/or delete entries from the cache. These cache readers and cache writers can work simultaneously in parallel, which makes it difficult to maintain a single source of information such as a list that can be used to find the least-recently-used entry. Additionally, a human administrator may remove entries from the cache manually. For example, the administrator may decide to remove a branch of a directory from the cache to make room for new entries. The cache manager may have no knowledge of such changes to the cache. Thus, the cache manager may not have accurate information to correctly identify and remove the least-recently-used entries.

Instead of requiring exact information and having to count and measure the entire cache, embodiments disclosed herein provide a new way to manage a large filesystem-based cache using inexact information obtained by randomly sampling parts of the cache. The results are then extrapolated as indicative of the cache as a whole. For large caches, a sample of several hundred entries suffices to give an adequate model of the distribution of access times and entry sizes in the cache as a whole if the sample entries are guaranteed to have been selected from the overall population randomly. To achieve this randomness, the addresses of entries in the cache are not the same as the uniform resource locators (URLs) that users use to request content. Instead, the address of an entry is a message-digest of the entry's URL and any relevant variation information for that URL. An URL is a compact string of characters used to represent a resource available at a network location. Examples of relevant variation information may include request header values such as locale, language, version, etc. associated with the URL.

Figure 5:
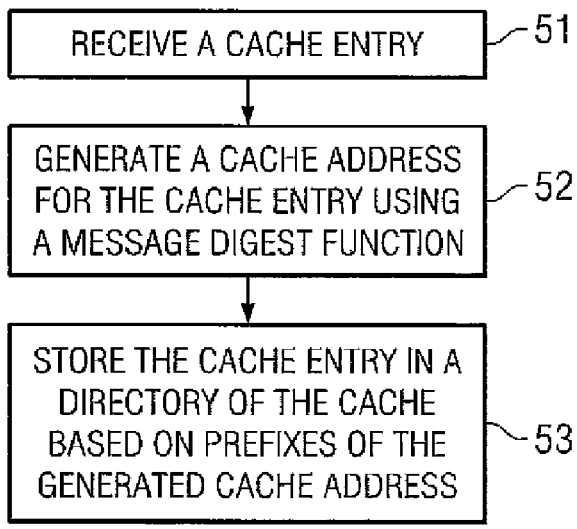
FIG. 5 is a flow diagram depicting one embodiment of a caching method.

FIG. 5 is a flow diagram depicting one embodiment of a caching method exemplifying how the address of a cache entry can be generated. At step 51, the content manager receives a new entry to be stored in the cache. As described above with reference to FIG. 4, the new entry may contain a new page that has been dynamically generated at the back end by a page generator in response to an end user's request for content. The new page may have an URL/site/products.html. At step 52, the content manager may operate to generate a cache address for the new entry using a message-digest function.

A message-digest function is a cryptographic hash function that converts an arbitrary length input into a fixed length result such that the probability of two different inputs producing the same output is vanishingly small. A reliable message-digest function should produce two outputs that are significantly different even for small differences in the two inputs. In one embodiment, Message-Digest algorithm 5 (MD5) is utilized. MD5 produces a 128-bit hash value which is typically expressed as a 32-digit hexadecimal number. For example, the URL/site/products.html produces a cache address of 220F3D1E99AC1691909C4D11965AF27D, while the URL/site/products2.html (which differs only by the addition of a single character) produces a cache address of 5C7CC94AA191EAE80CD9C20B5CF44668. As one of ordinary skill in the art can appreciate, other quality message-digest functions can also be utilized.

At step 53, the cache entry is stored in a directory of the cache using prefixes of the cache address thus generated. In embodiments disclosed herein, prefixes of the cache address are used as directory names in the cache and all entries are stored in the leaves of the directory tree. Thus, following the above example, the first entry might wind up in a directory named 22/0F/3D while the second entry might wind up in a directory named 5C/7C/C9. In this way, the entries in any particular directory are extremely unlikely to be related to one another in any significant way. As such, they sufficiently represent a random sample of the overall population of the cache. One advantage of caching the entries in this manner is that, not only randomness can be achieved, but also it can be achieved economically and without performance penalty. Otherwise, picking random entries from directories without uniform depths would be a costly and difficult challenge.

Figure 6:
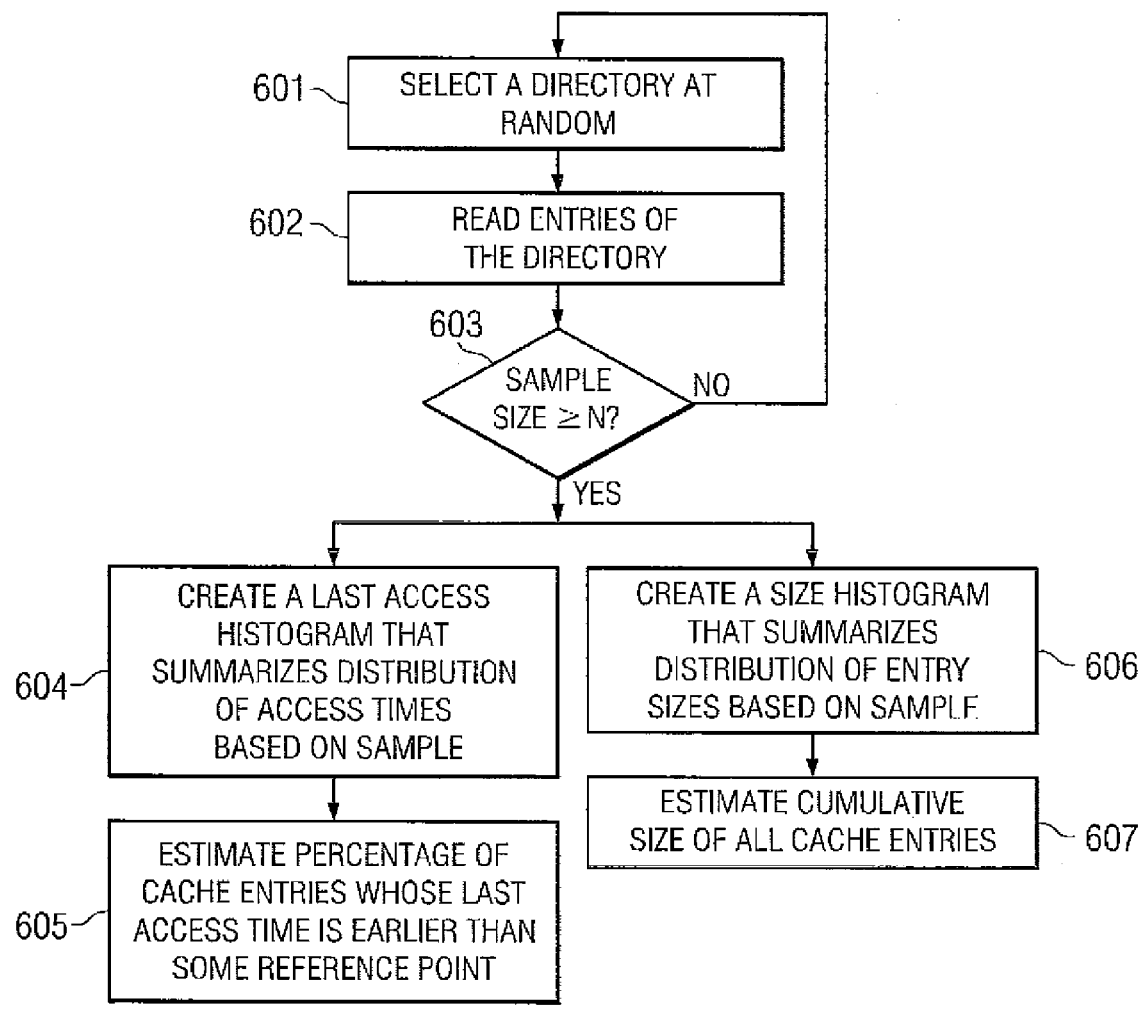
FIG. 6 is a flow diagram depicting one embodiment of statistical approximations.

FIG. 6 is a flow diagram depicting one embodiment of statistical approximations. To obtain a random sample of the cache, at step 601, a directory of the cache is selected at random. At step 602, entries of the randomly selected directory are read. The number of total entries in the randomly selected directory represents the size of the statistical sample of the population (i.e., the total number of entries stored in the cache). At step 603, the size of the statistical sample of the population is compared to a predefined size threshold, say, N, to determine whether the statistical sample of the population is sufficiently large to adequately represent the total number of entries stored in the cache. This predefined size threshold can be established and configurable by an administrator. In some cases, the sample size threshold can be a percentage of the total size of the cache. If steps 601 and 602 do not produce a large enough (i.e., statistically significant) sample, the process is repeated: another directory of the cache is selected at random and entries of that directory are read until a large enough sample is obtained.

Once the sample has been obtained, it is used to build models, represented in this case by histograms. On the left side of FIG. 6, the sample is used to create an equal-width histogram that summarizes the distribution of access times in the sample (step 604). For example, if the sample consists of N entries, and the last access histogram has M buckets, then each bucket $B_i$ consists of N/M entries such that $B_i$ contains only entries whose access times are greater than the entries in any other bucket $B_j$ for $0 \leq j < i < M$ where i, j, and M are integers. As an example, N can be 384 or more. A sample size of 384 or more entries can produce results with 95% level of confidence, which is sufficient for the purpose of managing a large filesystem-based cache. In some embodiments, the number of entries for the sample (N) can be a predetermined threshold. In some embodiments, N is configurable by an administrator.

The resulting histogram is used to estimate the percentage of cache entries whose last access time is earlier (older) than some cutoff time representing the rest of cache entries having later (younger) last access time (step 605). For example, suppose that we decide to build a 10-bucket last access histogram with buckets $B_0$ through $B_9$, with $B_0$ holding the sample entries with the oldest last access times and $B_9$ holding the sample entries with the youngest last access times. From that histogram we can estimate that 20% of the entries in the cache will have last access times older than the oldest last access time of the entries in $B_3$. In this way, a distribution model of last access time of the cache entries can be built in which it can be shown that, statistically, approximately 10% of the entries appear to have access time older than a first time reference point, approximately 20% of the entries appear to have access time older than a second time reference point, and so on. On the right side of FIG. 6, the same technique is used to build a distribution model of entry sizes in the cache. The sample is used to generate a size histogram that describes the distribution of cache entry sizes (step 606). In some embodiments, the number of entries in the cache can be estimated. With the estimated number of entries in the cache, this distribution model can be used to estimate the cumulative size of all cache entries (step 607). Steps 606 and 607 can be performed independent of steps 604 and 605.

One way to estimate the number of entries in the cache is to sample leaf directories in the cache and count the number of entries in each sample directory. From that sampling, the number of entries can be estimated per leaf directory and, if the number of leaf directories is known, the total number of entries in the cache can be estimated as the product of the estimated number of entries per directory and the number of directories (i.e., Estimated Total Number Of Entries in Cache=Number Of Directories*Estimated Number Of Entries Per Leaf Directory).

In some cases, not all leaf directories may actually exist. Below describes embodiments of a method of arriving at an estimate of the number of entries in the cache regardless of whether all leaf directories actually exist.

In some embodiments, an estimate of the number of entries in the cache can be computed by first computing estimates for the average number of entries at each level of the cache and then multiplying those estimates. For example, suppose we have a three-level deep cache (that is, three levels of directories, with the cached files stored in the third level of directories). We take a sample of the cache by randomly selecting a first-level directory and recording the number of second-level children it has, then randomly selecting one of those second-level children and recording the number of third-level children it contains, and then randomly selecting one of the third-level directories and recording the number of entries in that directory. If the directory selected at a particular level is empty, a zero observation is recorded for that level and all levels below it. After a number of samples, then, we have estimates for directory sizes at each level. Let P be the number of pages held in the cache, and let D1, D2, and D3 be the number of directories at the first, second, and third levels, respectively. Because entries are randomly and uniformly distributed throughout the cache, the sampled value for the average number of subdirectories in a first-level directory should be close to D2/D1 (i.e., the total number of second-level directories divided by the total number of first-level directories). Similarly, the sampled value of the average number of subdirectories in a second-level directory should be close to D3/D2, and the sampled value of the average number of entries in a third-level directory should be close to P/D3. Multiplying those together to get the number of pages held in the cache:

$$D1*(D2/D1)*(D3/D2)*(P/D3)=P$$

Since we have an exact value for D1 and approximations for D2/D1, D3/D2, and P/D3, we can compute an approximate value for P. Although the above example used a three-level directory structure, the technique can be extended to structures of arbitrary depth.

Figure 7:
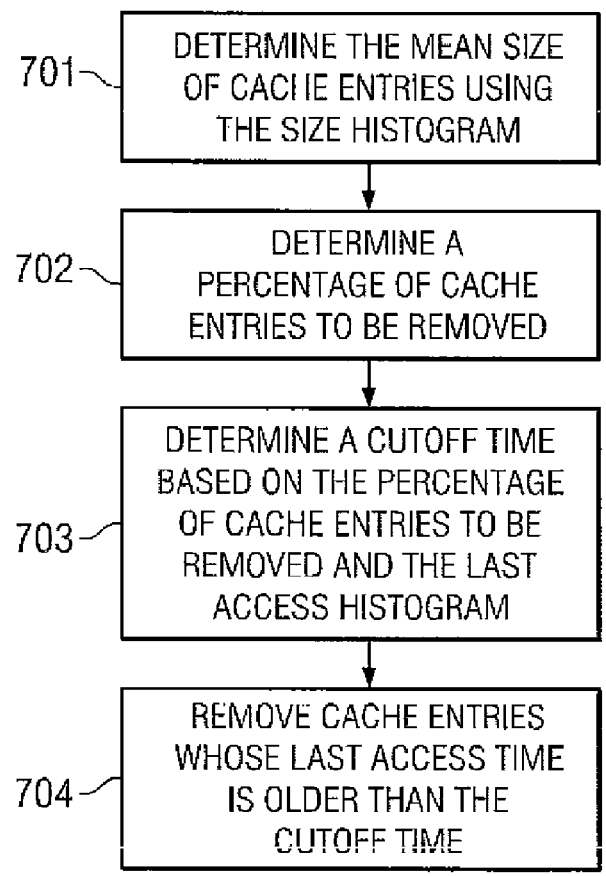
FIG. 7 is a flow diagram depicting one embodiment of cache management actions based on the statistical approximations.

FIG. 7 is a flow diagram depicting one embodiment of cache management actions based on the statistical approximations. At step 701, the size histogram is used to determine the mean size of cache entries. At step 702, the mean size of cache entries is used to decide what percentage of the cache entries need to be removed. At step 703, the cache entry removal percentage and the last access histogram are used to determine a cutoff time. At step 704, the cache is scanned and entries whose last access time is older than the cutoff time are removed.

The above-described process can occur when the estimated cumulative size of all cache entries approaches a configuration limit on total size of the cache. As described before, the configuration limit can be a threshold established and configured by an administrator. The administrator can establish a percentage of the threshold as the cleanup percentage, which is one of the configuration parameters of the cache. When it's time to cleanup, a background thread or process is started by a cache manager. Although there might be multiple cache managers, only one of them would be running the cleanup process at a time. This background thread runs through the cache, takes a statistical sampling of the cache, performs the steps described above, collects entries that are older than the cutoff time, and delete them from the cache.

As an example, suppose that 25% of the entries need to be removed (step 702). Based on this percentage and the last access histogram generated based on the current sample, the cutoff time corresponds to 4:30 PM yesterday (step 703). The background thread will look for entries that are older than 4:30 PM yesterday and continue to do so until enough entries are removed or until it is killed (stopped) for some reason. As those in the art can appreciate, an application process (thread) may end in many ways. For example, a user can manually stop a process at any time. In some embodiments, another configuration parameter of the cache may control the behavior of the cleanup process(es).

One advantage of the above-described approach is that, if one thread gets killed or is stopped for any reason before the cleanup is completed, another thread can come up and continue to do the same thing. This can be particularly useful with large size entries. For example, if a background cleanup thread dies in the middle of removing a 5 GB entry, the next thread can be started. This next thread will again take a statistical sampling of the cache, build distribution models accordingly, and start working on removing entries whose last access time is older than the cutoff time. This cutoff time may or may not be the same as the cutoff time that the last thread was working on. If this thread also gets killed before it finishes its job, another thread can be started to continue the cleanup work. Each thread takes a statistical sample of the population and builds corresponding distribution models on entry sizes and last access times. Using this combination and base on distribution, each cleanup thread can gain the knowledge on the approximate size of the cache. Once the cleanup thread figures out how big the cache is, it can then take appropriate action without using and/or maintaining a list and without having to examine every entry in the cache in order to find the least-recently-used entry for removal.

Figure 8:
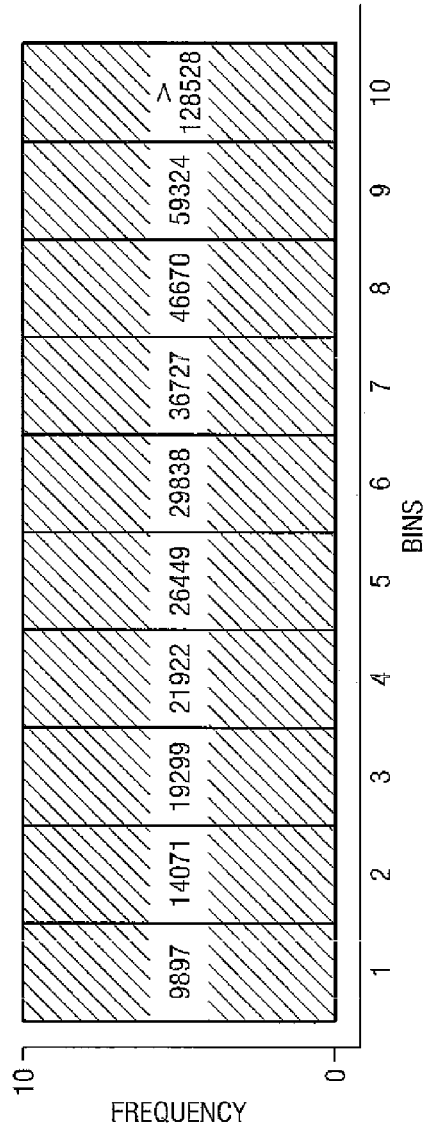
FIG. 8 depicts one embodiment of an example size histogram.
Figure 9:
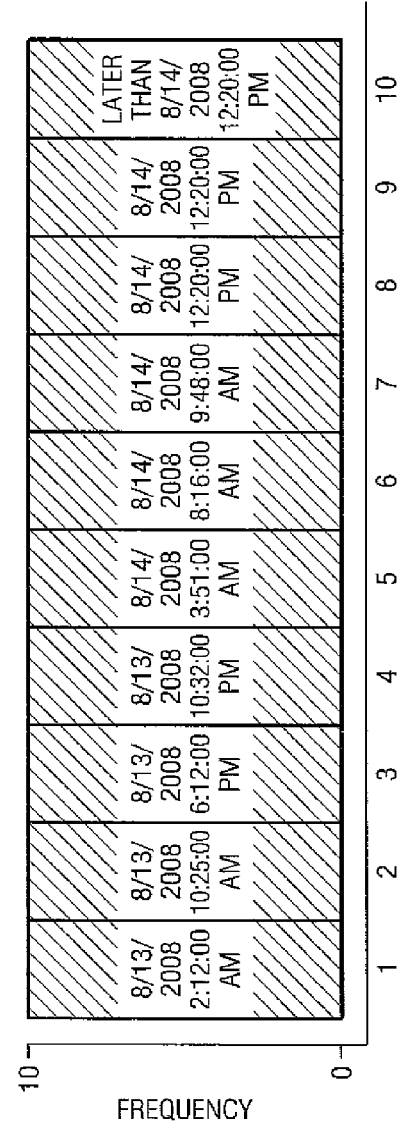
FIG. 9 depicts one embodiment of an example last access histogram.

FIGS. 8 and 9 illustrate another set of sample distributions. FIG. 8 depicts one embodiment of an example size histogram with 10 constant-height buckets (bins) for size and FIG. 9 depicts one embodiment of an example last access histogram with 10 constant-height buckets for access time. In FIGS. 8 and 9, all values in a bin are between the value listed for that bucket and the value listed for the predecessor bucket. In FIG. 8, 10% of the cache entries sampled fell in Bin 7. This means that 10% of all the cache entries sampled have a size somewhere between 29838 (exclusive) and 36727 (inclusive) bytes. Since each bin represents 10% of the sample taken, it can be inferred that 70% of all the cache entries sampled have a size of 36727 or less. Suppose that these histograms were computed from 100 cache entries sampled at step 602 and suppose that those 100 samples averaged to 33484 bytes. If it is estimated that there are 100,000 entries in the cache, then it is possible to estimate that those 100,000 entries would occupy 100,000*33484=3,348,300,000 bytes, roughly 3 GB. Suppose the cache size is 3.2 GB and the cleanup percentage is 62.5% (about 2 GB), the cache manager or an administrator may begin a cleanup process to reclaim about 1 GB of the estimated 3 GB space being used in the cache. If the average entry size is 33484 bytes, that means roughly 30,000 entries, or 30% of the total entries stored in the cache would need to be reclaimed (i.e., removed from the cache).

Referring to a corresponding last access histogram computed from the same set of cached entries randomly sampled at step 602, it can be seen that the oldest 30% of the entries were last accessed at Aug. 13, 2008 6:12:00 PM or earlier. This temporal reference can be used as the cutoff time or the basis from which the cutoff time is established. After setting the cutoff time, the cleanup process can begin to remove from the cache those entries whose access time is the same or older than the cutoff time. The above-described process assumes that page size and last access time are independent.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A method of managing a cache, comprising:
at a computer, obtaining a statistical sampling of said cache;
generating a last access histogram based on said statistical sampling of said cache, wherein said last access histogram represents a distribution of access times of entries in said cache;
generating a size histogram based on said statistical sampling of said cache, wherein said size histogram represents a distribution of entry sizes in said cache;
determining a mean size of cache entries using said size histogram;
determining a percentage of entries to be removed from said cache;
determining a cutoff time based on said last access histogram and said percentage of said entries to be removed from said cache; and
removing, from said cache, entries whose last access time is older than said cutoff time.

2. The method of claim 1, further comprising:
based on said last access histogram, estimating a percentage of cache entries whose last access time is earlier than a reference point in time.

3. The method of claim 1, further comprising:
based on said size histogram, estimating a cumulative size of all cache entries.

4. The method of claim 1, wherein obtaining a statistical sampling of said cache comprises:
randomly selecting a directory of said cache;
reading entries of said randomly selected directory of said cache; and
comparing a number of said entries of said randomly selected directory of said cache to a predefined sample size.

5. The method of claim 4, wherein said number of said entries of said randomly selected directory of said cache is smaller than said predefined sample size, further comprising:
repeating said randomly selecting step and said reading step until said number of said entries matches or exceeds said predefined sample size.

6. The method of claim 1, further comprising:
receiving a cache entry; and
generating a cache address for said cache entry using a message-digest function.

7. The method of claim 6, further comprising:
storing said cache entry in said directory of said cache based on prefixes of said cache address.

8. The method of claim 1, wherein said cache contains a million or more entries.

9. A system, comprising:
a processor;
at least one non-transitory computer-readable storage medium accessible by said processor and carrying computer instructions executable by said processor, wherein when executed by said processor said computer instructions are operable to perform:
obtaining a statistical sampling of a filesystem-based cache;
generating a last access histogram based on said statistical sampling of said cache, wherein said last access histogram represents a distribution of access times of entries in said cache;
generating a size histogram based on said statistical sampling of said cache, wherein said size histogram represents a distribution of entry sizes in said cache;
determining a mean size of cache entries using said size histogram;
determining a percentage of entries to be removed from said cache;
determining a cutoff time based on said last access histogram and said percentage of said entries to be removed from said cache; and
removing from said cache entries whose last access time is older than said cutoff time.

10. The system of claim 9, wherein said computer instructions are further operable to perform:
based on said last access histogram, estimating a percentage of cache entries whose last access time is earlier than a reference point in time.

11. The system of claim 9, wherein said computer instructions are further operable to perform:
based on said size histogram, estimating a cumulative size of all cache entries.

12. The system of claim 9, wherein said computer instructions are further operable to perform:
randomly selecting a directory of said cache;
reading entries of said randomly selected directory of said cache;
comparing a number of said entries of said randomly selected directory of said cache to a predefined sample size; and
repeating said randomly selecting step and said reading step until said number of said entries matches said predefined sample size.

13. The system of claim 9, wherein said computer instructions are further operable to perform:
receiving a cache entry;
generating a cache address for said cache entry using a message-digest function; and
storing said cache entry in said directory of said cache based on prefixes of said cache address.

14. A computer program product comprising at least one computer-readable storage medium accessible by a processor and carrying computer instructions executable by said processor, wherein when executed by said processor said computer instructions are operable to perform:
- obtaining a statistical sampling of a filesystem-based cache;
- generating a last access histogram based on said statistical sampling of said cache, wherein said last access histogram represents a distribution of access times of entries in said cache;
- generating a size histogram based on said statistical sampling of said cache, wherein said size histogram represents a distribution of entry sizes in said cache;
- determining a mean size of cache entries using said size histogram;
- determining a percentage of entries to be removed from said cache;
- determining a cutoff time based on said last access histogram and said percentage of said entries to be removed from said cache; and
- removing from said cache entries whose last access time is older than said cutoff time.

15. The computer program product of claim 14, wherein said computer instructions are further operable to perform:
- based on said last access histogram, estimating a percentage of cache entries whose last access time is earlier than a reference point in time.

16. The computer program product of claim 14, wherein said computer instructions are further operable to perform:
- based on said size histogram, estimating a cumulative size of all cache entries.

17. The computer program product of claim 14, wherein said computer instructions are further operable to perform:
- randomly selecting a directory of said cache;
- reading entries of said randomly selected directory of said cache;
- comparing a number of said entries of said randomly selected directory of said cache to a predefined sample size; and
- repeating said randomly selecting step and said reading step until said number of said entries matches or exceeds said predefined sample size.

18. The computer program product of claim 14, wherein said computer instructions are further operable to perform:
- receiving a cache entry;
- generating a cache address for said cache entry using a message-digest function; and
- storing said cache entry in said directory of said cache based on prefixes of said cache address.

* * * * *